(12) United States Patent
Kawakami et al.

(10) Patent No.: US 6,258,162 B1
(45) Date of Patent: Jul. 10, 2001

(54) CEMENT COMPOSITION

(75) Inventors: Hirokatsu Kawakami, Sakai; Hirokazu Niwa, Osaka; Hiromichi Tanaka, Takatsuki; Tsutomu Yuasa, Osaka; Tsuyoshi Hirata, Kobe, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/405,566

(22) Filed: Sep. 25, 1999

(30) Foreign Application Priority Data

Oct. 22, 1998 (JP) .................................................. 10-300852

(51) Int. Cl.$^7$ ........................... C04B 24/26; C08F 220/06
(52) U.S. Cl. ......................... 106/810; 106/724; 106/727; 106/728; 106/802; 106/808; 106/823; 524/5
(58) Field of Search ................................ 106/724, 727, 106/728, 802, 808, 810, 823; 524/5

(56) References Cited

U.S. PATENT DOCUMENTS

| | | | |
|---|---|---|---|
| 4,808,641 | 2/1989 | Yagi et al. ................................ | 524/5 |
| 5,665,158 | * 9/1997 | Darwin et al. ......................... | 106/808 |
| 5,728,207 | * 3/1998 | Arfaei et al. ........................... | 106/709 |
| 5,736,600 | * 4/1998 | Karkare et al. ........................ | 524/400 |
| 5,753,744 | * 5/1998 | Darwin et al. ......................... | 524/549 |
| 5,840,114 | * 11/1998 | Jeknavorian et al. ................ | 106/802 |
| 5,912,284 | * 6/1999 | Hirata et al. ............................. | 524/5 |
| 5,925,184 | * 7/1999 | Hirata et al. ........................... | 106/696 |

FOREIGN PATENT DOCUMENTS

| | | |
|---|---|---|
| 0 692 465 | 1/1996 | (EP) . |
| 0 792 850 | 9/1997 | (EP) . |
| 6-279082 | 10/1994 | (JP) . |
| 6-321596 | 11/1994 | (JP) . |
| 7-025651 | 1/1995 | (JP) . |
| 8-165156 | 6/1996 | (JP) . |
| 9-241056 | 9/1997 | (JP) . |
| 9-248438 | 9/1997 | (JP) . |
| WO97/48656 | 12/1997 | (WO) . |

* cited by examiner

*Primary Examiner*—Anthony Green

(57) ABSTRACT

The present invention provides a cement additive which can achieve excellent fluid retainability and has excellent mortar kneadability. The cement additive comprises copolymer (A) having polyalkylene glycol ester unit (I) and carboxylic unit (II) as repeating units, wherein polyalkylene glycol ester unit (I) has an oxyalkylene group with 3 to 7 carbon atoms on an ester bonding moiety.

10 Claims, No Drawings

CEMENT COMPOSITION

BACKGROUND OF THE INVENTION

A. Technical Field

The present invention relates to a cement additive, and more particularly, to a cement additive having excellent fluid retainability of a cement composition such as cement paste, mortar or concrete, and further, excellent mortar kneadability.

B. Background Art

Since early deterioration of concrete structures became social problems in 1981, it has been strongly required to improve execution and durability of the concrete structures by decreasing the unit quantity of water in concrete. Thus, a lot of technological innovation is carried out to cement admixtures which have much influence on the quality and the capability of cement mixtures.

Especially, as to polycarboxylic cement dispersants, many proposals were made, because the polycarboxylic cement dispersants exhibit higher water reducibility than conventional cement dispersants such as naphthalenic ones. For example, JP-A-06-321596 and JP-A-06-279082 propose polymers as formed from a (meth)acrylic monomer in which an ester bond between polyalkylene glycol and (meth)acrylic acid is made through propylene oxide. However, even as to these polycarboxylic acids with oxyalkylene groups, it is insufficient to achieve excellent fluid retainability and excellent mortar kneadability.

As to the oxyalkylene group, as things stand, the above known patent publications (JP-A-06-321596 and JP-A-06-279082) disclose only oxyalkylene groups of which the chain length of ethylene oxide as linked to polypropylene oxide is short in acrylic esters.

As is mentioned above, the above conventional cement dispersants have problems in that they lack the fluid retainability and are still insufficient to shorten the kneading time of mortar and concrete.

SUMMARY OF THE INVENTION

A. Object of the Invention

An object of the present invention is to provide a cement additive which can achieve excellent fluid retainability and has excellent mortar kneadability, therefore, can shorten the production time of mortar and concrete and thereby enhance the productivity thereof.

B. Disclosure of the Invention

Acrylic esters have much more excellent mortar kneadability and water reducibility than methacrylic esters. However, on the other hand, acrylic esters more easily undergo hydrolysis of ester bonding in a cement alkali and more easily decrease the mortar or concrete fluidity with time than methacrylic esters. The present inventors diligently studied and, as a result, completed the present invention by finding that if the structure in a polyalkylene glycol ester unit is specified, it is possible to suppress the hydrolyzability of the ester moiety of the acrylic ester to thereby allow the acrylic ester to thoroughly exhibit its excellent performance, in other words, it is possible to achieve excellent fluid retainability and to enhance the mortar kneadability.

The structure in a polyalkylene glycol ester unit, as specified by the present invention, is described in detail below, but the point is briefed as follows:

(1) an alkylene oxide chain with a large number of carbon atoms is bonded to the ester bonding moiety (thereto the ethylene oxide chain is not bonded); and (2) the proportion of the ethylene oxide chain in the alkylene oxide chain is high.

Thus, the present invention provides cement additives as shown in <1> to <4> below.

<1> The object is achieved with a cement additive which comprises copolymer (A) having polyalkylene glycol ester unit (I) of general formula (1) below as a repeating unit and carboxylic unit (II) of general formula (2) below as a repeating unit, wherein general formula (1) is:

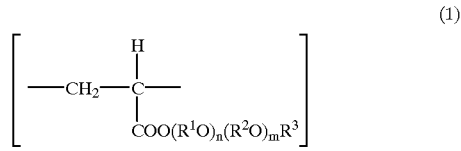

where:

$R^1O$ denotes an oxyalkylene group with 3 to 7 carbon atoms or a mixture of two or more thereof, wherein the mixture may be formed by either block addition or random addition;

$R^2O$ denotes an oxyalkylene group with 2 to 18 carbon atoms or a mixture of two or more thereof, wherein the mixture may be formed by either block addition or random addition;

$R^3$ denotes a hydrocarbon group with 1 to 3 carbon atoms;

n is an average molar number of addition of $R^1O$ and denotes a number of 1 to 50;

m is an average molar number of addition of $R^{20}$ and denotes a number of 35 to 300; and not less than 80 mol % of the oxyalkylene groups (total of $R^1O$ and $R^2O$) are oxyethylene groups;

and wherein general formula (2) is:

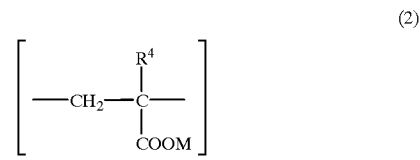

where:

$R^4$ denotes hydrogen or a methyl group; and

M denotes hydrogen, a monovalent metal, a divalent metal, ammonium, or an organic amine.

<2> The object is achieved also with a cement additive which comprises copolymer (B) as obtained by a process including the step of copolymerizing a monomer mixture including polyalkylene glycol ester monomer (IV) of general formula (3) below and carboxylic monomer (V) of general formula (4) below, wherein general formula (3) is:

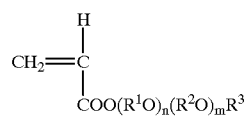
(3)

where the symbols are the same as those in general formula (1) above;

and wherein general formula (4) is:

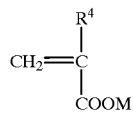
(4)

where the symbols are the same as those in general formula (2) above.

<3>The object is achieved also with a cement additive which comprises copolymer (C) having polyalkylene glycol ester unit (VII) of general formula (5) below as a repeating unit and carboxylic unit (VIII) of general formula (6) below as a repeating unit, wherein general formula (5) is:

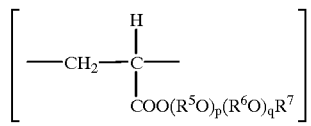
(5)

where:

$R^5O$ denotes an oxyalkylene group with 4 to 7 carbon atoms or a mixture of two or more thereof, wherein the mixture may be formed by either block addition or random addition;

$R^6O$ denotes an oxyalkylene group with 2 to 18 carbon atoms or a mixture of two or more thereof, wherein the mixture may be formed by either block addition or random addition;

$R^7$ denotes a hydrocarbon group with 1 to 3 carbon atoms;

p is an average molar number of addition of $R^5O$ and denotes a number of 1 to 50;

q is an average molar number of addition of $R^6O$ and denotes a number of 1 to 300; and not less than 80 mol % of the oxyalkylene groups (total of $R^5O$ and $R^6O$) are oxyethylene groups;

and wherein general formula (6) is:

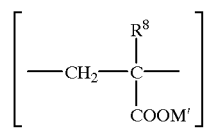
(6)

where:

$R^8$ denotes hydrogen or a methyl group; and

M' denotes hydrogen, a monovalent metal, a divalent metal, ammonium, or an organic amine.

<4>The object is achieved also with a cement additive which comprises copolymer (D) as obtained by a process including the step of copolymerizing a monomer mixture including polyalkylene glycol ester monomer (X) of general formula (7) below and carboxylic monomer (XI) of general formula (8) below, wherein general formula (7) is:

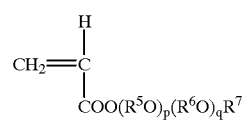
(7)

where the symbols are the same as those in general formula (5) above;

and wherein general formula (8) is:

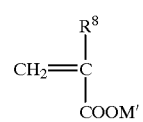
(8)

where the symbols are the same as those in general formula (6) above.

These and other objects and the advantages of the present invention will be more fully apparent from the following detailed disclosure.

DETAILED DESCRIPTION OF THE INVENTION

The cement additive according to the present invention comprises at least one copolymer selected from the group consisting of copolymers (A) to (D).

Copolymer (A) is a copolymer which has repeating units (I) and (II). Copolymer (A) can be obtained by a process including the step of copolymerizing a monomer mixture including a monomer to give repeating unit (I) of general formula (1) above and a monomer to give repeating unit (II) of general formula (2) above. In addition, copolymer (A) can also be obtained by a process including the step of directly esterifying an alkoxypolyalkylene glycol with a polyacrylic acid or a poly(acrylic acid-methacrylic acid) copolymer.

In addition, copolymer (B) is a copolymer as obtained by a process including the step of copolymerizing a monomer mixture including monomers (IV) and (V).

Copolymer (C) is a copolymer which has repeating units (VII) and (VIII). Copolymer (C) can be obtained by a process including the step of copolymerizing a monomer mixture including a monomer to give repeating unit (VII) of general formula (5) above and a monomer to give repeating unit (VIII) of general formula (6) above. In addition, copolymer (A) can also be obtained by a process including the step of directly esterifying an alkoxypolyalkylene glycol with a polyacrylic acid or a poly(acrylic acid-methacrylic acid) copolymer.

In addition, copolymer (D) is a copolymer as obtained by a process including the step of copolymerizing a monomer mixture including monomers (X) and (XI).

The monomer (polyalkylene glycol ester monomer (IV)) to give repeating unit (I) is a product by esterification of acrylic acid with a block addition form of alkoxypolyalkylene glycol as obtained by adding 35~300 mol of an alkylene oxide with 2 to 18 carbon atoms and then 1~50 mol of an alkylene oxide with 3 to 7 carbon atoms to any one of the following alcohols: aliphatic alcohols with 1 to 3 carbon atoms, such as methanol, ethanol, 1-propanol, and 2-propanol; alcohols having an alkenyl group with 3 carbon atoms, such as allyl alcohol; and alcohols having an alkynyl group with 3 carbon atoms, such as propargyl alcohol.

The monomer (polyalkylene glycol ester monomer (X)) to give repeating unit (VII) is a product by esterification of acrylic acid with a block addition form of alkoxypolyalkylene glycol as obtained by adding 1~300 mol of an alkylene oxide with 2 to 18 carbon atoms and then 1~50 mol of an alkylene oxide with 4 to 7 carbon atoms to any one of the above alcohols.

Specific examples of the monomers (polyalkylene glycol ester monomers (IV) and (X)) to give repeating units (I) and (VII) include the following monomers. However, the monomers as hereinafter marked with * are specific examples of the monomer (polyalkylene glycol ester monomer (IV)) to give repeating unit (I), but are not specific examples of the monomer (polyalkylene glycol ester monomer (X)) to give repeating unit (VII). Alkoxypolyalkylene glycol (poly) (alkylene glycol) acrylates (the alkylene glycols in the braces { } may be in the form of either random addition or block addition), such as methoxypolyethylene glycol (poly)propylene glycol monoacrylate (*), methoxypolyethylene glycol (poly)butylene glycol monoacrylate, methoxypolyethylene glycol (poly)propylene glycol (poly)butylene glycol monoacrylate, ethoxypolyethylene glycol (poly)propylene glycol monoacrylate (*), ethoxypolyethylene glycol (poly)butylene glycol monoacrylate, ethoxypolyethylene glycol (poly)propylene glycol (poly)butylene glycol monoacrylate, propoxypolyethylene glycol (poly)propylene glycol monoacrylate (*), propoxypolyethylene glycol (poly)butylene glycol monoacrylate, propoxypolyethylene glycol (poly)propylene glycol (poly)butylene glycol monoacrylate, allyloxypolyethylene glycol (poly)propylene glycol monoacrylate (*), allyloxypolyethylene glycol (poly)butylene glycol monoacrylate, allyloxypolyethylene glycol (poly)propylene glycol (poly)butylene glycol monoacrylate, propargyloxypolyethylene glycol polypropylene glycol monoacrylate propargyloxypolyethylene glycol (poly)butylene glycol monoacrylate, propargyloxypolyethylene glycol (poly)propylene glycol (poly)butylene glycol monoacrylate, methoxy{polyethylene glycol polypropylene glycol} (poly)propylene glycol monoacrylate (*), methoxy{polyethylene glycol polybutylene glycol} (poly)propylene glycol monoacrylate (*), methoxy{polyethylene glycol polypropylene glycol polybutylene glycol} (poly)propylene glycol monoacrylate (*), methoxy{polyethylene glycol polypropylene glycol} (poly)butylene glycol monoacrylate, methoxy{polyethylene glycol polybutylene glycol} (poly)butylene glycol monoacrylate, methoxy{polyethylene glycol polypropylene glycol} {(poly)propylene glycol (poly)butylene glycol monoacrylate} (*), methoxy{polyethylene glycol polybutylene glycol} {(poly)propylene glycol (poly)butylene glycol monoacrylate} (*), methoxy{polyethylene glycol polypropylene glycol polybutylene glycol} {(poly)propylene glycol (poly)butylene glycol monoacrylate} (*), ethoxy{polyethylene glycol polypropylene glycol} (poly)propylene glycol monoacrylate (*), ethoxy{polyethylene glycol polybutylene glycol} (poly)propylene glycol monoacrylate (*), ethoxy{polyethylene glycol polypropylene glycol polybutylene glycol} (poly)propylene glycol monoacrylate (*), ethoxy{polyethylene glycol polypropylene glycol} (poly)butylene glycol monoacrylate, ethoxy{polyethylene glycol polybutylene glycol} (poly)butylene glycol monoacrylate, ethoxy{polyethylene glycol polypropylene glycol polybutylene glycol} (poly)butylene glycol monoacrylate, ethoxy{polyethylene glycol polypropylene glycol} {(poly)propylene glycol (poly)butylene glycol monoacrylate} (*), ethoxy{polyethylene glycol polybutylene glycol} {(poly)propylene glycol (poly)butylene glycol monoacrylate} (*), ethoxy{polyethylene glycol polypropylene glycol polybutylene glycol} {(poly)propylene glycol (poly)butylene glycol monoacrylate} (*), propoxy{polyethylene glycol polypropylene glycol} (poly)propylene glycol monoacrylate (*), propoxy{polyethylene glycol polybutylene glycol} (poly)propylene glycol monoacrylate (*), propoxy{polyethylene glycol polypropylene glycol polybutylene glycol} (poly)propylene glycol monoacrylate (*), propoxy{polyethylene glycol polypropylene glycol} (poly)butylene glycol monoacrylate, propoxy{polyethylene glycol polybutylene glycol} (poly)butylene glycol monoacrylate, propoxy{polyethylene glycol polypropylene glycol polybutylene glycol} (poly)butylene glycol monoacrylate, propoxy{polyethylene glycol polypropylene glycol} {(poly)propylene glycol (poly)butylene glycol monoacrylate} (*), propoxy{polyethylene glycol polybutylene glycol} {(poly)propylene glycol (poly)butylene glycol monoacrylate} (*), propoxy{polyethylene glycol polypropylene glycol polybutylene glycol} {(poly)propylene glycol (poly)butylene glycol monoacrylate} (*), allyloxy{polyethylene glycol polypropylene glycol} (poly)propylene glycol monoacrylate (*), allyloxy{polyethylene glycol polybutylene glycol} (poly)propylene glycol monoacrylate (*), allyloxy{polyethylene glycol polypropylene glycol polybutylene glycol} (poly)propylene glycol monoacrylate (*), allyloxy{polyethylene glycol polypropylene glycol} (poly)butylene glycol monoacrylate, allyloxy{polyethylene glycol polybutylene glycol} (poly)butylene glycol monoacrylate, allyloxy{polyethylene glycol polypropylene glycol polybutylene glycol} (poly)butylene glycol monoacrylate, allyloxy{polyethylene glycol polypropylene glycol} {(poly)propylene glycol (poly)butylene glycol monoacrylate} (*), allyloxy{polyethylene glycol polybutylene glycol} {(poly)propylene glycol (poly)butylene glycol monoacrylate} (*), allyloxy{polyethylene glycol polypropylene glycol polybutylene glycol} {(poly)propylene glycol (poly)butylene glycol monoacrylate} (*), propargyloxy{polyethylene glycol polypropylene glycol} (poly)propylene glycol monoacrylate (*), propargyloxy{polyethylene glycol polybutylene glycol} (poly)propylene glycol monoacrylate (*), propargyloxy{polyethylene glycol polypropylene glycol polybutylene glycol} (poly)propylene glycol monoacrylate (*), propargyloxy{polyethylene glycol polypropylene glycol} (poly)butylene glycol monoacrylate, propargyloxy{polyethylene glycol polybutylene glycol} (poly)butylene glycol monoacrylate, propargyloxy{polyethylene glycol polypropylene glycol polybutylene glycol} (poly)butylene glycol monoacrylate, propargyloxy{polyethylene glycol polypropylene glycol} {(poly)propylene glycol (poly)butylene glycol monoacrylate} (*), propargyloxy{polyethylene glycol polybutylene glycol} {(poly)propylene glycol (poly)butylene glycol monoacrylate} (*), and propargyloxy{polyethylene glycol polypropylene glycol polybutylene glycol} {(poly)propylene glycol (poly)butylene glycol monoacrylate} (*).

In repeating unit (I) (polyalkylene glycol ester monomer (IV)), it is necessary that the alkylene oxide chain (RIO) with 3 to 7 carbon atoms is linked to the alkylene oxide chain ($R^2O$) with 2 to 18 carbon atoms in the block form, and it is the most important that the alkylene oxide chain (RIO) with 3 to 7 carbon atoms is linked to the ester bonding moiety. Similarly, in repeating unit (VII) (polyalkylene glycol ester monomer (X)), it is necessary that the alkylene oxide chain ($R^5O$) with 4 to 7 carbon atoms is linked to the alkylene oxide chain ($R^6O$) with 2 to 18 carbon atoms in the block form, and it is the most important that the alkylene oxide chain ($R^5O$) with 4 to 7 carbon atoms is linked to the ester bonding moiety. Because, in conventional acrylic ester polymers, the ethylene oxide chain is linked to the ester bonding moiety, those polymers have the demerit of easily hydrolyzing in a cement alkali to eliminate the polyoxyethylene group which is a dispersible group, so that the fluid retainability decreases with time. However, if the alkylene oxide chain with a large number of carbon atoms is present on the ester bonding moiety like in the present invention, the hydrolysis of the polyoxyalkylene group can be prevented due to the hydrophobicity and steric hindrance effects of the alkylene oxide chain with a large number of carbon atoms.

Incidentally, the border between $R^1O$ and $R^2O$ in repeating unit (I) (polyalkylene glycol ester monomer (IV)) is such that $R^2O$ begins where an alkylene oxide chain of which the number of carbon atoms is out of the range of 3 to 7 (namely, of which the number of carbon atoms is 2 or in the range of 8 to 18) occurs for the first time when viewed from the ester bonding moiety side. Similarly, the border between $R^5O$ and $R^6O$ in repeating unit (VII) (polyalkylene glycol ester monomer (X)) is such that $R^6O$ begins where an alkylene oxide chain of which the number of carbon atoms is out of the range of 4 to 7 (namely, of which the number of carbon atoms is in the range of 2 to 3, or 8 to 18) occurs for the first time when viewed from the ester bonding moiety.

Examples of usable alkylene oxides ($R^2O$ and $R^6O$) with 2 to 18 carbon atoms include alkylene oxides such as ethylene oxide, propylene oxide, isobutylene oxide, 1-butene oxide, 2-butene oxide, and styrene oxide. But ethylene oxide is the most preferable for giving the hydrophilicity to the copolymer and performing excellent dispersibility and mortar kneadability, because the presence of an oxyalkylene chain with a large number of carbon atoms at a moiety other than the ester bonding moiety would enhance the hydrophobicity of the copolymer itself. In addition, one or more kinds of alkylene oxides with 2 to 18 carbon atoms can be used as the added alkylene oxide moiety with 2 to 18 carbon atoms. When using two or more kinds of the alkylene oxides, any form of random addition, block addition, and alternating addition can be used.

The average molar number (m) of addition of the alkylene oxide ($R^2O$) with 2 to 18 carbon atoms in repeating unit (I) (polyalkylene glycol ester monomer (IV)) is a number of 35 to 300, and the average molar number (q) of addition of the alkylene oxide ($R^6O$) with 2 to 18 carbon atoms in repeating unit (VII) (polyalkylene glycol ester monomer (X)) is a number of 1 to 300, preferably 35 to 300. And, in either case, the average molar number of addition of the alkylene oxide with 2 to 18 carbon atoms is preferably in the range of 51 to 280, more preferably 55 to 250, still more preferably 60 to 200, for the purpose of obtaining excellent dispersibility and enhancing the mortar kneadability. In the case where the average molar number of addition of the alkylene oxide with 2 to 18 carbon atoms is small, the mortar kneadability tends to be low. In addition, in the case where the average molar number of addition of the alkylene oxide with 2 to 18 carbon atoms is larger than 300, it is difficult to obtain excellent dispersibility.

Examples of the alkylene oxide ($R^1O$) with 3 to 7 carbon atoms in repeating unit (I) (polyalkylene glycol ester monomer (IV)), which is usable, include alkylene oxides such as propylene oxide, butylene oxide, isobutylene oxide, 1-butene oxide, and 2-butene oxide. Preferable are products by addition of alkylene oxides with 3 to 6 carbon atoms, and more preferable are products by addition of alkylene oxide with 3 to 5 carbon atoms, and still more preferable are products by addition of propylene oxide or butylene oxide with 3 to 4 carbon atoms. In addition, one or more kinds of alkylene oxides with 3 to 7 carbon atoms can be used as the added alkylene oxide moiety with 3 to 7 carbon atoms. When using two or more kinds of the alkylene oxides, any form of random addition, block addition, and alternating addition can be used.

Examples of the alkylene oxide ($R^5O$) with 4 to 7 carbon atoms in repeating unit (VII) (polyalkylene glycol ester monomer (X)), which is usable, include alkylene oxides such as butylene oxide, isobutylene oxide, 1-butene oxide, and 2-butene oxide. Preferable are products by addition of alkylene oxides with 4 to 6 carbon atoms, and more preferable are products by addition of alkylene oxide with 4 to 5 carbon atoms, and still more preferable are products by addition of butylene oxide with 4 carbon atoms. In addition, one or more kinds of alkylene oxides with 4 to 7 carbon atoms can be used as the added alkylene oxide moiety with 4 to 7 carbon atoms. When using two or more kinds of the alkylene oxides, any form of random addition, block addition, and alternating addition can be used.

The average molar number (n) of addition of the alkylene oxide ($R^1O$) with 3 to 7 carbon atoms in repeating unit (I) and the average molar number (p) of addition of the alkylene oxide ($R^5O$) with 4 to 7 carbon atoms in repeating unit (VII) are in the range of 1~50 mol, but preferably 1~30 mol, more preferably 2~20 mol, still more preferably 2~10 mol, yet still more preferably 2~5 mol. The case where the average molar number of addition is smaller than 1 means including a component with a molar number of addition of 0 mol which easily hydrolyzes in a cement alkali. In the case where the average molar number of addition is not smaller than 1 mol, but smaller than 2 mol, there might be included a component with a molar number of addition of 0 mol which is unable to sufficiently give the hydrophobicity and easily hydrolyzes in a cement alkali, therefore the effect to prevent the hydrolysis is low. However, if not less than 2 mol of the alkylene oxide is introduced, the hydrophobicity can be enhanced sufficiently, and the amount of the component with a molar number of addition of 0 mol which easily hydrolyzes in a cement alkali can be reduced sufficiently, so that the hydrolysis can sufficiently be prevented. On the other hand, in the case where the average molar number of addition is larger than 50, the hydrolysis resistance is enhanced, but the cement dispersibility is deteriorated due to the hydrophobicity and steric hindrance of the copolymer itself. Thus, the distribution of the molar numbers of addition of the alkylene oxide ($R^1O$) with 3 to 7 carbon atoms in repeating unit (I) and the distribution of the molar numbers of addition of the alkylene oxide ($R^5O$) with 4 to 7 carbon atoms in repeating unit (VII) are preferably such that the ratio of the polyalkylene glycol ester units with a molar number of addition of RIO or $R^5O$ of 0 mol is not more than 2 weight % of the entire polyalkylene glycol ester units (I) or (VII) in terms of alcohol ($HO(R^1O)_n(R^2O)_mR^3$) or ($HO(R^5O)_p(R^6O)_qR^7$) respectively, and further that the ratio of the polyalkylene glycol ester units with a molar number of addition of $R^1O$ or $R^5O$ of not larger than 1 mol is not more than 20 weight % of the entire polyalkylene glycol ester units (I) or (VII)

respectively in terms of alcohol $(HO(R^1O)_n(R^2O)_mR^3)$ or $(HO(R^5O)_p(R^6O)_qR^7)$.

In repeating unit (I) (polyalkylene glycol ester monomer (IV)), not less than 80 mol % of the oxyalkylene groups (total of the alkylene oxide chain with 3 to 7 carbon atoms ($R^1O$) and the alkylene oxide chain with 2 to 18 carbon atoms ($R^2O$)) need to be oxyethylene groups, and preferably not less than 90 mol %, more preferably not less than 95 mol %, of the oxyalkylene groups (total of $R^1O$ and $R^2O$) are oxyethylene groups. Similarly, in repeating unit (VII) (polyalkylene glycol ester monomer (X)), not less than 80 mol % of the oxyalkylene groups (total of the alkylene oxide chain with 4 to 7 carbon atoms ($R^5O$) and the alkylene oxide chain with 2 to 18 carbon atoms ($R^6O$)) need to be oxyethylene groups, and preferably not less than 90 mol %, more preferably not less than 95 mol %, of the oxyalkylene groups (total of $R^5O$ and $R^6O$) are oxyethylene groups. Because the presence of an oxyalkylene chain with a large number of carbon atoms at a moiety other than the ester bonding moiety would enhance the hydrophobicity of the copolymer itself, therefore, deteriorate the cement dispersibility.

In addition, for the same reason as above, in repeating unit (I) (polyalkylene glycol ester monomer (IV)), it is preferable that there is a relation of (m/n)>8 between the average molar number n of addition of the alkylene oxide chain with 3 to 7 carbon atoms ($R^1O$) and the average molar number m of addition of the alkylene oxide chain with 2 to 18 carbon atoms ($R^2O$). Similarly, in repeating unit (VII) (polyalkylene glycol ester monomer (X)), it is preferable that there is a relation of (q/p)>8 between the average molar number p of addition of the alkylene oxide chain with 4 to 7 carbon atoms ($R^5O$) and the average molar number q of addition of the alkylene oxide chain with 2 to 18 carbon atoms ($R^6O$).

Terminal $R^3$ and $R^7$ of the oxyalkylene groups are hydrocarbon groups with 1 to 3 carbon atoms. For performing excellent dispersibility and mortar kneadability, hydrocarbon groups with 1 to 2 carbon atoms are preferable, and hydrocarbon groups with 1 carbon atom are more preferable. Hydrocarbon groups with more than 3 carbon atoms have too strong hydrophobicity to obtain good dispersibility and mortar kneadability.

Incidentally, the monomers (polyalkylene glycol ester monomers (IV)) to give repeating unit (I) and the monomers (polyalkylene glycol ester monomers (X)) to give repeating unit (VII) can be used either alone respectively or in combinations with each other.

Examples of the monomers (carboxylic monomers (V) and (XI)) to give repeating units (II) and (VIII) respectively include acrylic acid, methacrylic acid, and their monovalent metal salts, divalent metal salts, ammonium salts, and organic amine salts. These can be used either alone respectively or in combinations with each other. For the enhancement of the cement dispersibility and the mortar kneadability, it is preferable to use acrylic acid and its monovalent metal salts, divalent metal salts, ammonium salts, or organic amine salts.

If necessary, the following components can further be introduced: repeating units (III) other than repeating units (I) and (II); monomers (VI) other than polyalkylene glycol ester monomer (IV) and carboxylic monomer (V); repeating units (IX) other than repeating units (VII) and (VIII); and monomers (XII) other than polyalkylene glycol ester monomer (X) and carboxylic monomer (XI). Examples of monomers to give repeating units (III) and (IX) and examples of monomers (VI) and (XII) include: unsaturated dicarboxylic acids, such as maleic acid, fumaric acid, itaconic acid, and citraconic acid, and their monovalent metal salts, divalent metal salts, ammonium salts, and organic amine salts, or anhydrides of the unsaturated dicarboxylic acids; half esters and diesters of the above unsaturated dicarboxylic acids with alcohols having 1 to 22 carbon atoms; half amides and diamides of the above unsaturated dicarboxylic acids with amines having 1 to 22 carbon atoms; half esters and diesters of the above unsaturated dicarboxylic acids with alkyl polyalkylene glycols as obtained by adding 1 to 300 mol of alkylene oxides with 2 to 4 carbon atoms to the above alcohols or amines; half esters and diesters of the above unsaturated dicarboxylic acids with glycols having 2 to 4 carbon atoms or with polyalkylene glycols of 2 to 300 in molar number of addition of the foregoing glycols; half amides of maleamic acid with glycols having 2 to 4 carbon atoms or with polyalkylene glycols of 2 to 300 in molar number of addition of the foregoing glycols; (poly)alkylene glycol di(meth)acrylates, such as triethylene glycol di(meth)acrylate, (poly)ethylene glycol di(meth)acrylate, polypropylene glycol di(meth)acrylate, and (poly)ethylene glycol (poly)propylene glycol di(meth)acrylate; difunctional (meth)acrylates, such as hexanediol di(meth)acrylate, trimethylolpropane tri(meth)acrylate, and trimethylolpropane di(meth)acrylate; (poly)alkylene glycol dimaleates, such as triethylene glycol dimaleate and polyethylene glycol dimaleate; unsaturated sulfonic acids, such as vinylsulfonates, (meth)allylsulfonates, 2-(meth)acryloxyethylsulfonates, 3-(meth)acryloxypropylsulfonates, 3-(meth)acryloxy-2-hydroxypropylsulfonates, 3-(meth)acryloxy-2-hydroxypropylsulfophenyl ether, 3-(meth)acryloxy-2-hydroxypropyloxysulfobenzoates, 4-(meth)acryloxybutylsulfonates, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; esters of (meth)acrylic acid with alcohols having 1 to 22 carbon atoms, such as methyl (meth)acrylate, ethyl (meth)acrylate, propyl (meth)acrylate, butyl (meth)acrylate, 2-ethylhexyl (meth)acrylate, 2-hydroxyethyl (meth)acrylate, hydroxypropyl (meth)acrylate, hydroxybutyl (meth)acrylate, methyl crotonate, and glycidyl (meth)acrylate; amides of unsaturated monocarboxylic acids with amines having 1 to 22 carbon atoms, such as methyl(meth)acrylamide; vinyl aromatic compounds, such as styrene, α-methylstyrene, vinyltoluene, and p-methylstyrene; alkanediol mono(meth)acrylates, such as 1,4-butanediol mono(meth)acrylate, 1,5-pentanediol mono(meth)acrylate, and 1,6-hexanediol mono(meth)acrylate; dienes, such as butadiene, isoprene, 2-methyl-1,3-butadiene, and 2-chloro-1,3-butadiene; unsaturated amides, such as (meth)acrylamide, (meth)acrylalkylamide, N-methylol(meth)acrylamide, and N,N-dimethyl(meth)acrylamide; unsaturated cyanes, such as (meth)acrylonitrile and α-chloroacrylonitrile; unsaturated esters, such as vinyl acetate and vinyl propionate; unsaturated amines, such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic compounds, such as divinylbenzene; cyanurates, such as triallyl cyanurate; allyl compounds, such as (meth)allyl alcohol and glycidyl (meth)allyl ether; unsaturated amino compounds, such as dimethylaminoethyl (meth)acrylate; vinyl ethers or allyl ethers, such as methoxypolyethylene glycol monovinyl ether, polyethylene glycol monovinyl ether, methoxypolyethylene glycol mono(meth)allyl ether, and polyethylene glycol mono(meth)allyl ether; siloxane derivatives such as polydimethylsiloxanepropylaminomaleamic acid, polydimethylsiloxaneaminopropyleneaminomaleamic acid, polydimethylsiloxanebis (propylaminomaleamic acid), polydimethylsiloxanebis (dipropyleneaminomaleamic acid), polydimethylsiloxane-(1-propyl-3-acrylate), polydimethylsiloxane-(1-propyl-3-methacrylate), polydimethylsiloxanebis(1-propyl-3-acrylate), and polydimethylsiloxanebis(1-propyl-3-methacrylate); and products by esterification of methacrylic acid with alkoxypolyalkylene glycols, as obtained by adding 1 to 300 mol of alkylene oxides with 2 to 18 carbon atoms to alcohols with 1 to 30 carbon atoms, such as methoxypolyethylene glycol, ethoxypolyethylene glycol, propoxypolyethylene glycol, methoxypolyethylene glycol polypropylene glycol, ethoxypolyethylene glycol polypropylene glycol, and propoxypolyethylene glycol polypropylene glycol. These may be used either alone respectively or in combinations with each other. For maintaining the dispersibility and dispersion retainability of the copolymer to cement, it is preferable to introduce the products by esterification of methacrylic acid with alkoxypolyalkylene glycols, particularly, alkoxypolyethylene glycols, as obtained by adding of ethylene oxide to alcohols with 1 to 3 carbon atoms, such as methoxypolyethylene glycol, among the above repeating units (monomers).

It is preferable that copolymer (A) according to the present invention comprises repeating units (I), (II) and (III) in the weight ratio (I)/(II)/(III)=(1~99)/(99~1)/(0~50), more preferably (40~99)/(60~1)/(0~50), still more preferably (70~97)/(30~3)/(0~30), yet still more preferably (75~96)/(25~4)/(0~10).

It is preferable that copolymer (B) according to the present invention comprises (IV), (V) and (VI) in the weight ratio (IV)/(V)/(VI)=(1~99)/(99~1)/(0~50), more preferably (40~99)/(60~1)/(0~50), still more preferably (70~97)/(30~3)/(0~30), yet still more preferably (75~96)/(25~4)/(0~10).

It is preferable that copolymer (C) according to the present invention comprises repeating units (VII), (VIII) and (IX) in the weight ratio (VII)/(VIII)/(IX)=(1~99)/(99~1)/(0~50), more preferably (40~99)/(60~1)/(0~50), still more preferably (70~97)/(30~3)/(0~30), yet still more preferably (75~96)/(25~4)/(0~10).

It is preferable that copolymer (D) according to the present invention comprises (X), (XI) and (XII) in the weight ratio (X)/(XI)/(XII)=(1~99)/(99~1)/(0~50), more preferably (40~99)/(60~1)/(0~50), still more preferably (70~97)/(30~3)/(0~30), yet still more preferably (75~96)/(25~4)/(0~10).

The weight-average molecular weight of each of copolymers (A) to (D) is usually in the range of 5,000~200,000, preferably 10,000~100,000, more preferably 15,000~80,000, still more preferably 20,000~70,000. In the case where these component ratio and weight-average molecular weight are out of the above ranges, there is no obtaining a cement additive that exhibits high water reducibility and the enhanced mortar kneadability.

Methods to obtain copolymers (A) to (D) are not especially limited and, for example, conventional polymerization methods such as solution polymerization and bulk polymerization using polymerization initiators can be used. In addition, copolymers (A) and (C) can be obtained also by a process including the step of directly esterifying an alkoxypolyalkylene glycol, for example, with a polyacrylic acid or a poly(acrylic acid-methacrylic acid) copolymer.

The polymerization method can be carried out in either a batch manner or a continuous manner. The solvent, as used therefor if necessary, may be a conventional one and is not especially limited. Examples thereof include: water; alcohols, such as methyl alcohol, ethyl alcohol, and isopropyl alcohol; aromatic or aliphatic hydrocarbons, such as benzene, toluene, xylene, cyclohexane, and n-heptane; esters, such as ethyl acetate; and ketones, such as acetone and methyl ethyl ketone. Considering the solubilities of the monomer mixture and the resultant polycarboxylic acid, it is preferable to use at least one member selected from the group consisting of water and lower alcohols with 1 to 4 carbon atoms.

The polymerization initiator may be a conventional one and is not especially limited. Examples of such a polymerization initiator include: persulfate salts, such as ammonium persulfate, sodium persulfate, and potassium persulfate; hydrogen peroxide; azo compounds, such as azobis(2-methylpropionamidine) hydrochloride and azobisisobutyronitrile; and peroxides, such as benzoyl peroxide, lauroyl peroxide, and cumene hydroperoxide. These may be used either alone respectively or in combinations with each other. In this case, promotors can further be used, and examples thereof include: reducing agents, such as sodium hydrogensulfite, sodium sulfite, Mohr's salts, sodium pyrobisulfite, sodium formaldehydesulfoxylate, and ascorbic acid; and amine compounds, such as ethylenediamine, sodium ethylenediaminetetraacetate, and glycine. These may be used either alone respectively or in combinations with each other.

Chain transfer agents also can be used, if necessary. The chain transfer agents may be conventional ones and are not especially limited, but examples thereof include: mercaptopropionic acid, 2-ethylhexyl mercaptopropionate, 2-mercaptoethyl octanoate, 1,8-dimercapto-3,6-dioxaoctane, decanetrithiol, dodecylmercaptan, hexadecanethiol, decanethiol, carbon tetrachloride, carbon tetrabromide, α-methylstyrene dimer, terpinolene, α-terpinene, γ-terpinene, dipentene, and 2-aminopropan-1-ol. These may be used either alone respectively or in combinations with each other.

The polymerization temperature is fitly determined from the polymerization method, solvent, polymerization initiator, or chain transfer agent as used, but is usually in the range of 0~150° C.

Copolymers (A) to (D) according to the present invention, as obtained in the above way, may directly be used as the main component of the cement additive. However, if necessary, copolymers (A) to (D) may further be treated by neutralization with an alkaline substance before being used. Preferable examples of such an alkaline substance include: inorganic salts, such as hydroxides, chlorides and carbonates of mono- and divalent metals; ammonia; and organic amines.

Copolymers (A) to (D) according to the present invention may be added in the ratio of 0.01~10 weight %, preferably 0.05~5 weight %, in terms of solid content, to the cement weight. The amount of addition smaller than 0.01 weight % is insufficient to the performance. Or otherwise, even if an amount exceeding 10 weight % is used, there are economical disadvantages.

The cement composition, to which each of copolymers (A) to (D) according to the present invention is added, comprises cement, water, and the present invention cement additive. Examples thereof include cement paste (aqueous cement slurry), mortar, and concrete. The aqueous cement paste comprises cement, water, and the present invention cement additive as the essential components. The mortar further comprises sand in addition to the cement paste as the essential components. The concrete further comprises stone in addition to the mortar as the essential components. These cement paste, mortar, and concrete generally comprise materials as fitly selected from the group consisting of cement, water, fine aggregates, and coarse aggregates, but may further comprise fine powders such as fly ash, shaft furnace slag, silica fume, and limestone. The cement as used is, generally, normal Portland cement, but the following other materials are also available: Portland cement, such as high-early-strength types, ultra-high-early-strength types, moderate heat types, and white types; and mixed portland cement, such as alumina cement, fly ash cement, slag cement, and silica cement. There is no especial limitation with regard to the amount of cement as used and the unit water amount, per 1 $m^3$ of concrete. However, for the production of concrete of high durability and high strength, the unit water amount of 100~185 kg/$m^3$ and the water/cement ratio=10~70 weight % are recommended, and the unit water amount of 120~175 kg/$m^3$ and the water/cement ratio=20~65 weight % are preferably recommended.

In addition, the cement additive of the present invention can be used jointly with conventional cement dispersants. Examples of the conventional cement dispersant, as used jointly, include: ligninsulfonic acid salts; polyol derivatives; naphthalenesulfonic acid-formalin condensation products; melaminesulfonic acid-formalin condensation products; polystyrenesulfonic acid salts; aminosulfonic compounds, such as aminoarylsulfonic acid-phenol-formaldehyde condensation products (JP-A-01-113419); and polycarboxylic acids (or salts thereof), for example: cement dispersants comprising (a) copolymers and/or salts thereof, as formed from polyalkylene glycol mono(meth)acrylate compounds and (meth)acrylic compounds, (b) copolymers and/or their hydrolyzed products and/or salts, as formed from polyalkylene glycol mono(meth)allyl ether compounds and maleic anhydride, and (c) copolymers and/or salts thereof, as formed from polyalkylene glycol mono(meth)allyl ether compounds and polyalkylene glycol maleates (JP-A-07-267705); admixtures for concrete, comprising (A) copolymers as formed from polyalkylene glycol (meth)acrylates and (meth)acrylic acid (or salts thereof), (B) specific polyethylene glycol polypropylene glycol compounds, and (C) specific surfactants (Japanese Patent No. 2508113); copolymers as formed from either polyethylene(propylene) glycol (meth)acrylate or polyethylene(propylene) glycol mono (meth)allyl ether, and (meth)allylsulfonic acid (or salts thereof) and (meth)acrylic acid (or salts thereof) (JP-A-62-216950); copolymers as formed from polyethylene (propylene) glycol (meth)acrylate, (meth)allylsulfonic acid (or salts thereof), and (meth)acrylic acid (or salts thereof) (JP-A-01-226757); copolymers as formed from polyethylene(propylene) glycol (meth)acrylate, either (meth)allylsulfonic acid (or salts thereof) or p-(meth) allyloxybenzenesulfonic acid (or salts thereof), and (meth) acrylic acid (or salts thereof) (JP-B-05-036377); copolymers as formed from polyethylene glycol mono(meth)allyl ether and maleic acid (or salts thereof) (JP-A-04-149056); copolymers as formed from polyethylene glycol (meth)acrylate, (meth)allylsulfonic acid (or salts thereof), (meth)acrylic acid (or salts thereof), alkanediol mono(meth)acrylate, polyalkylene glycol mono(meth)acrylate, and α,β-unsaturated monomers with an amide group in their molecules (JP-A-05-170501); copolymers as formed from polyethylene glycol mono(meth)allyl ether, polyethylene glycol mono(meth) acrylate, alkyl (meth)acrylates, (meth)acrylic acid (or salts thereof), and either (meth)allylsulfonic acid (or salts thereof) or p-(meth)allyloxybenzenesulfonic acid (or salts thereof) (JP-A-06-191918); copolymers or their hydrolyzed products or salts, as formed from alkoxypolyalkylene glycol monoallyl ether and maleic anhydride (JP-A-05-043288); copolymers or their salts or esters, as formed from polyethylene glycol monoallyl ether, maleic acid, and monomers copolymerizable with these monomers (JP-B-58-038380); copolymers as formed from polyalkylene glycol mono (meth)acrylate monomers, (meth)acrylic ester monomers, and monomers copolymerizable with these monomers (JP-B-59-018338); copolymers or salts thereof, as formed from (meth)acrylic esters with a sulfonic acid group and, in case of need, monomers copolymerizable therewith (JP-A-62-119147); products by esterification of alkenyl-terminal polyoxyalkylene derivatives with copolymers as formed from alkoxypolyalkylene glycol monoallyl ether and maleic anhydride (JP-A-06-271347); and products by esterification of hydroxy-terminal polyoxyalkylene derivatives with copolymers as formed from alkoxypolyalkylene glycol monoallyl ether and maleic anhydride (JP-A-06-298555). These conventional cement dispersants can be jointly used in plural.

Incidentally, when the above conventional cement dispersant is jointly used with the present invention cement additive, the mixing ratio by weight of the present invention cement additive to the conventional cement dispersant is usually in the range of (5~95):(95~5), preferably (10~90):(90~10), though not uniformly determinable, depending on differences in factors such as kind, composition, and test conditions of the cement dispersant as used.

Furthermore, the cement additive of the present invention can be used in combination with other conventional cement additives (materials to add to cement) as exemplified below:

(1) water-soluble high-molecular substances, for example: unsaturated carboxylic acid polymers such as polyacrylic acid (or its sodium salt), polymethacrylic acid (or its sodium salt), polymaleic acid (or its sodium salt), and sodium salts of acrylic acid-maleic acid copolymers; polymers or copolymers of polyoxyethylene or polyoxypropylene such as polyethylene glycol and polypropylene glycol; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharides produced by microbiological fermentation such as yeast glucan, xanthane gum, and β-1.3 glucans (which may be either a linear or branched chain type and of which examples include curdlan, paramylon, vacciman, scleroglucan and laminaran); polyacrylamide; polyvinyl alcohol; starch; starch phosphate; sodium alginate; gelatin; and acrylic acid copolymers having an amino group in their molecules and their quaternized compounds;

(2) high-molecular emulsions, for example: copolymers of various vinyl monomers such as alkyl (meth) acrylates;

(3) retarders, for example: oxycarboxylic acids such as gluconic acid, glucoheptonic acid, arabonic acid, malic acid or citric acid, and their inorganic or organic salts of sodium, potassium, calcium, magnesium, ammonium and triethanolamine; saccharides, for example, monosaccharides such as glucose, fructose, galactose, saccharose, xylose, apiose, ribose, and isomerized saccharides, or oligosaccharides such as disaccharides and trisaccharides, or oligosaccharides such as dextrin, or polysaccharides such as dextran, or molasses including them; sugar alcohols such as sorbitol; magnesium silicofluoride; phosphoric acid and its salts or borates; aminocarboxylic acids and its salts; alkali-soluble proteins; fumic acid; tannic acid; phenol; polyhydric alcohols such as glycerol; and phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and their alkaline metal salts and alkaline earth metal salts;

(4) high-early-strength agents and promotors, for example: soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonic acid salts; thiosulfates; formic acid and formates such as calcium formate; alkanol amines; alumina cement; and calcium aluminate silicate;

(5) mineral oil base defoaming agents, for example: kerosine and liquid paraffin;

(6) oils-and-fats base defoaming agents, for example: animal and plant oils, sesame oil, castor oil and their alkylene oxide adducts;

(7) fatty acid base defoaming agents, for example: oleic acid, stearic acid and their alkylene oxide adducts;

(8) fatty acid ester base defoaming agents, for example: glycerol monoricinolate, alkenyl succinic acid derivatives, sorbitol monolaurate, sorbitol trioleate, and natural wax;

(9) oxyalkylene base defoaming agents, for example: polyoxyalkylenes such as (poly)oxyethylene (poly) oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and adducts of oxyethylene oxypropylene to higher alcohols with 12 to 14 carbon atoms; (poly)oxyalkylene (alkyl) aryl ethers such as polyoxypropylene phenyl ether and polyoxyethylene nonyl phenyl ether; acetylene ethers as formed by addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly) oxyalkylene fatty acid esters such as diethylene glycol oleic acid ester, diethylene glycol lauric acid ester, and ethylene glycol distearic acid; (poly)oxyalkylene sorbitan fatty acid esters such as (poly)oxyethylene sorbitan monolauric acid ester and (poly)oxyethylene sorbitan trioleic acid ester; (poly)oxyalkylene alkyl (aryl) ether sulfuric acid ester salts such as sodium polyoxypropylene methyl ether sulfate, and sodium polyoxyethylene dodecylphenol ether sulfate; (poly) oxyalkylene alkyl phosphoric acid esters such as (poly) oxyethylene stearyl phosphate; (poly)oxyalkylene alkylamines such as polyoxyethylene laurylamine; and polyoxyalkylene amide;

(10) alcohol base defoaming agents, for example: octyl alcohol, hexadecyl alcohol, acetylene alcohol, and glycols;

(11) amide base defoaming agents, for example: acrylate polyamines;

(12) phosphoric acid ester base defoaming agents, for example: tributyl phosphate and sodium octyl phosphate;

(13) metal soap base defoaming agents, for example: aluminum stearate and calcium oleate;

(14) silicone base defoaming agents, for example: dimethyl silicone oils, silicone pastes, silicone emulsions, organic-denatured polysiloxanes (polyorganosiloxanes such as dimethyl polysiloxane), and fluorosilicone oils;

(15) AE agents, for example: resin soap, saturated or unsaturated fatty acids, sodium hydroxystearate, lauryl sulfate, ABS (alkylbenzenesulfonic acids), LAS (linear alkylbenzenesulfonic acids), alkanesulfonates, polyoxyethylene alkyl (phenyl) ethers, polyoxyethylene alkyl (phenyl) ether sulfuric add esters or its salts, polyoxyethylene alkyl (phenyl) ether phosphoric acid esters or its salts, protein materials, alkenylsulfosuccinic acids, and α-olefinsulfonates;

(16) other surfactants, for example: polyalkylene oxide derivatives as formed by addition of 10 mol or more of alkylene oxides, such as ethylene oxide and propylene oxide, to aliphatic monohydric alcohols with 6 to 30 carbon atoms in the molecules, such as octadecyl alcohol and stearyl alcohol, or to alicyclic monohydric alcohols with 6 to 30 carbon atoms in the molecules, such as abiethyl alcohol, or to monovalent mercaptans with 6 to 30 carbon atoms in the molecules, such as dodecyl mercaptan, or to alkylphenols with 6 to 30 carbon atoms in the molecules, such as nonylphenol, or to amines with 6 to 30 carbon atoms in the molecules, such as dodecylamine, or to carboxylic acids with 6 to 30 carbon atoms in the molecules, such as lauric acid and stearic acid; alkyl diphenyl ether sulfonates as formed by ether-bonding of two phenyl groups having a sulfonic acid group, which may have an alkyl or alkoxy group as a substituent; various kinds of anionic surfactants; various kinds of cationic surfactants such as alkylamine acetate and alkyltrimethylammonium chloride; various kinds of nonionic surfactants; and various kinds of amphoteric surfactants;

(17) waterproofing agents, for example: fatty acids (or their salts), fatty acid esters, oils and fats, silicone, paraffin, asphalt, and wax;

(18) anticorrosives, for example: nitrous acid salts, phosphoric acid salts, and zinc oxide;

(19) fissure-reducing agents, for example: polyoxyalkyl ethers; alkanediols such as 2-methyl-2,4pentanediol; and

(20) swelling materials, for example: ettringite base and coal base ones.

Examples of yet other conventional cement additives (materials to add to cement) include: cement humectants, thickeners, separation-decreasing agents, flocculants, dry-shrinkage-diminishing agents, strength-enhancing agents, self-levelling agents, anticorrosives, colorants, moldproofing agents, shaft furnace slag, fly ash, cinder ash, clinker ash, husk ash, silica fume, silica powder, and gypsum. These conventional cement additives (materials to add to cement) can be jointly used in plural.

Examples of especially preferable embodiments include the following 1)~3):

1) A combination comprising the following two components: (1) the present invention cement additive and (2) a ligninsulfonic acid salt. Incidentally, the mixing ratio by weight of (1) the present invention cement additive to (2) the ligninsulfonic acid salt is preferably in the range of (5~95): (95~5), more preferably (10~90): (90~10).

2) A combination comprising the following two components: (1) the present invention cement additive and (2)

the oxyalkylene base defoaming agent. Incidentally, the mixing ratio by weight of (2) the oxyalkylene base defoaming agent is preferably in the range of 0.01~10 weight % of (1) the present invention cement additive.

3) A combination comprising the following three components: (1) the present invention cement additive, (2) the copolymer as formed from a polyalkylene glycol mono(meth)acrylate monomer, a (meth)acrylic ester monomer, and a monomer copolymerizable with these monomers (JP-B-59-018338), and (3) the oxyalkylene base defoaming agent. Incidentally, the mixing ratio by weight of (3) the oxyalkylene base defoaming agent is preferably in the range of 0.01~10 weight % of the total of (1) the present invention cement additive and (2) the copolymer.

(Effects and Advantages of the Invention)

As is mentioned above, the use of the present invention cement additive can shorten the kneading time of mortar and concrete, therefore, is effective also for high fluid concrete, and can shorten the production time of mortar or concrete and thereby enhance the productivity thereof. Furthermore, the present invention cement additive has so excellent fluid retainability that this cement additive can enhance the workability of mortar or concrete.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. Incidentally, in the examples, unless otherwise noted, the unit "%" is by weight.

<Method to measure distribution and average of molar numbers of addition of alkylene oxide chains>

The copolymer was hydrolyzed with an aqueous sodium hydroxide solution, and the composition (ratio by weight) of the alkylene oxide constituting the resultant alcohol was measured by liquid chromatography. The weight average of the molar numbers of addition was taken as the average molar number of addition.

Measurement Conditions of Liquid Chromatography

Measurement instrument: Millenium System (made by Waters Co., Ltd.)

Detector: 410RI Detector (made by Waters Co., Ltd.)

Columns used: ODS-2 (3 columns) (made by GL Science)

Eluent used: as prepared by adjusting the pH of a mixture of 6,000 g of acetonitrile, 8,946 g of water, and 54 g of acetic acid to 4 with a 30% aqueous sodium hydroxide solution.

Flow rate: 0.6 ml/min

Measurement temperature: 35° C.

<Method to measure weight-average molecular weight (Mw) of copolymer>

The measurement conditions were as follows:

Measurement instrument: Millenium System (made by Waters Co., Ltd.)

Detector: 410RI Detector (made by Waters Co., Ltd.)

Columns used: TSK-GEL G4000SWXL, TSK-GEL G3000SWXL, TSK-GEL G2000SWXL (made by TOSOH Corporation)

Eluent used: as prepared by adjusting the pH of a mixture of 1,765 g of acetonitrile, 3,235 g of water, and 34 g of sodium acetate trihydrate to 6 with acetic add.

Flow rate: 1.0 ml/min

Measurement temperature: 25° C.

Standard samples: Polyethylene glycols with weight-average molecular weights of 170,000; 85,000; 46,000; 26,000; 12,600; and 7,100.

PRODUCTION EXAMPLE 1

First of all, 169.4 g of water was placed into a glass-made reaction vessel as equipped with a thermometer, a stirrer, a dropping funnel, a nitrogen-introducing tube and a reflux condenser. and the internal atmosphere of the reaction vessel was then replaced with nitrogen under stirring, and the reaction vessel was then heated to 80° C. under the nitrogen atmosphere. Next, an aqueous monomer solution, as prepared by mixing 52.9 g of methoxypolyethylene glycol polypropylene glycol monoacrylate (average molar number of addition of ethylene oxide=75; average molar number of addition of propylene oxide=2), 7.1 g of acrylic acid, 0.5 g of a 30% aqueous sodium hydroxide solution, 39.5 g of water and 0.6 g of 3-mercaptopropionic acid, was dropped into the reaction vessel together with 24 g of a 1.15% aqueous sodium persulfate solution over a period of 4 hours, and then 6 g of a 1.15% aqueous sodium persulfate solution was further dropped over a period of 1 hour. Thereafter, the temperature was maintained at 80° C. for 1 hour to complete the polymerization reaction, thus obtaining an aqueous solution of present invention copolymer (1) with a weight-average molecular weight of 34,900.

PRODUCTION EXAMPLE 2

First of all, 169.4 g of water was placed into a glass-made reaction vessel as equipped with a thermometer, a stirrer, a dropping funnel, a nitrogen-introducing tube and a reflux condenser. and the internal atmosphere of the reaction vessel was then replaced with nitrogen under stirring, and the reaction vessel was then heated to 80° C. under the nitrogen atmosphere. Next, an aqueous monomer solution, as prepared by mixing 52.7 g of methoxypolyethylene glycol polypropylene glycol monoacrylate, 2.1 g of acrylic acid, 5.2 g of methacrylic acid, 0.4 g of a 30% aqueous sodium hydroxide solution, 36.9 g of water and 0.6 g of 3-mercaptopropionic acid, was dropped into the reaction vessel together with 24 g of a 2.3% aqueous ammonium persulfate solution over a period of 4 hours, and then 6 g of a 2.3% aqueous ammonium persulfate solution was further dropped over a period of 1 hour. Thereafter, the temperature was maintained at 80° C. for 1 hour to complete the polymerization reaction. The resultant copolymer was neutralized with a 30% aqueous sodium hydroxide solution so as to have pH 7.0, thus obtaining an aqueous solution of present invention copolymer (2) with a weight-average molecular weight of 35,600.

The measurement of distribution and average of molar numbers of addition of alkylene oxide chains for the resultant copolymer (2) by the above method gave the following results: average molar number of addition of ethylene oxide=75; average molar number of addition of propylene oxide=2.6; amount of ethylene oxide introduced=96.6 mol %; m/n=28.8. The distribution of molar numbers of addition of propylene oxide was as follows:

| Molar number of addition of propylene oxide | Weight % |
| --- | --- |
| 0 | 0 |
| 1 | 15.0 |
| 2 | 33.5 |
| 3 | 30.2 |
| 4 | 15.3 |
| 5 | 4.9 |
| 6 | 1.1 |
| 7 and larger | 0 |

PRODUCTION EXAMPLE 3

First of all, 169.4 g of water was placed into a glass-made reaction vessel as equipped with a thermometer, a stirrer, a dropping funnel, a nitrogen-introducing tube and a reflux condenser. and the internal atmosphere of the reaction vessel was then replaced with nitrogen under stirring, and the reaction vessel was then heated to 80° C. under the nitrogen atmosphere. Next, an aqueous monomer solution, as prepared by mixing 34.2 g of the same methoxypolyethylene glycol polypropylene glycol monoacrylate as used in Production Example 2, 18.7 g of methoxypolyethylene glycol monomethacrylate (average molar number of addition of ethylene oxide=23), 7.2 g of acrylic acid, 0.5 g of a 30% aqueous sodium hydroxide solution, 34.8 g of water and 0.5 g of 3-mercaptopropionic acid, was dropped into the reaction vessel together with 24 g of a 2.3% aqueous ammonium persulfate solution over a period of 4 hours, and then 6 g of a 2.3% aqueous ammonium persulfate solution was further dropped over a period of 1 hour. Thereafter, the temperature was maintained at 80° C. for 1 hour to complete the polymerization reaction. The resultant copolymer was neutralized with a 30% aqueous sodium hydroxide solution so as to have pH 7.0, thus obtaining an aqueous solution of present invention copolymer (3) with a weight-average molecular weight of 34,300.

PRODUCTION EXAMPLE 4

First of all, 99.6 g of water was placed into a glass-made reaction vessel as equipped with a thermometer, a stirrer, a dropping funnel, a nitrogen-introducing tube and a reflux condenser. and the internal atmosphere of the reaction vessel was then replaced with nitrogen under stirring, and the reaction vessel was then heated to 80° C. under the nitrogen atmosphere. Next, an aqueous monomer solution, as prepared by mixing 107.5 g of methoxypolyethylene glycol polybutylene glycol monoacrylate, 27.5 g of acrylic acid, 2.1 g of a 30% aqueous sodium hydroxide solution, 31.6 g of water and 1.7 g of 3-mercaptopropionic acid, was dropped into the reaction vessel together with 24 g of a 9% aqueous ammonium persulfate solution over a period of 4 hours, and then 6 g of a 9% aqueous ammonium persulfate solution was further dropped over a period of 1 hour. Thereafter, the temperature was maintained at 80° C. for 1 hour to complete the polymerization reaction. The resultant copolymer was neutralized with a 30% aqueous sodium hydroxide solution so as to have pH 7.0, thus obtaining an aqueous solution of present invention copolymer (4) with a weight-average molecular weight of 20,200.

The measurement of distribution and average of molar numbers of addition of alkylene oxide chains for the resultant copolymer (4) by the above method gave the following results: average molar number of addition of ethylene oxide=25; average molar number of addition of butylene oxide=2.6; amount of ethylene oxide introduced=90.6 mol %; m/n=9.6. The distribution of molar numbers of addition of butylene oxide was as follows:

| Molar number of addition of butylene oxide | Weight % |
| --- | --- |
| 0 | 0 |
| 1 | 11.7 |
| 2 | 36.4 |
| 3 | 35.0 |
| 4 | 16.9 |
| 5 and larger | 0 |

COMPARATIVE PRODUCTION EXAMPLE 1

First of all, 99.8 g of water was placed into a glass-made reaction vessel as equipped with a thermometer, a stirrer, a dropping funnel, a nitrogen-introducing tube and a reflux condenser. and the internal atmosphere of the reaction vessel was replaced with nitrogen under stirring, and the reaction vessel was heated to 80° C. under the nitrogen atmosphere. Next, an aqueous monomer solution, as prepared by mixing 118.9 g of methoxypolyethylene glycol polypropylene glycol monoacrylate (average molar number of addition of ethylene oxide=25; average molar number of addition of propylene oxide=2), 16.0 g of acrylic acid, 1.0 g of a 30% aqueous sodium hydroxide solution, 32.7 g of water and 1.5 g of 3-mercaptopropionic acid, was dropped into the reaction vessel together with 24 g of a 1.15% aqueous sodium persulfate solution over a period of 4 hours, and then 6 g of a 1.15% aqueous sodium persulfate solution was further dropped over a period of 1 hour. Thereafter, the temperature was maintained at 80° C. for 1 hour to complete the polymerization reaction, thus obtaining an aqueous solution of comparative copolymer (1) with a weight-average molecular weight of 22,300.

COMPARATIVE PRODUCTION EXAMPLE 2

First of all, 169 g of water was placed into a glass-made reaction vessel as equipped with a thermometer, a stirrer, a dropping funnel, a nitrogen-introducing tube and a reflux condenser. and the internal atmosphere of the reaction vessel was replaced with nitrogen under stirring, and the reaction vessel was heated to 80° C. under the nitrogen atmosphere. Next, an aqueous monomer solution, as prepared by mixing 55.3 g of methoxypolyethylene glycol monoacrylate (average molar number of addition of ethylene oxide=75), 7.5 g of acrylic acid, 0.1 g of a 30% aqueous sodium hydroxide solution, 40.0 g of water and 1.0 g of 3-mercaptopropionic acid, was dropped into the reaction vessel together with 24 g of a 4.6% aqueous sodium persulfate solution over a period of 4 hours, and then 6 g of a 4.6% aqueous sodium persulfate solution was further dropped over a period of 1 hour. Thereafter, the temperature was maintained at 80° C. for 1 hour to complete the polymerization reaction, thus obtaining an aqueous solution of comparative copolymer (2) with a weight-average molecular weight of 19,800.

REFERENTIAL PRODUCTION EXAMPLE 1

First of all, 169.4 g of water was placed into a glass-made reaction vessel as equipped with a thermometer, a stirrer, a dropping funnel, a nitrogen-introducing tube and a reflux condenser. and the internal atmosphere of the reaction vessel was then replaced with nitrogen under stirring, and the reaction vessel was then heated to 80° C. under the nitrogen atmosphere. Next, an aqueous monomer solution, as prepared by mixing 121.2 g of methoxypolyethylene glycol monomethacrylate (average molar number of addition of ethylene oxide=25), 13.8 g of methacrylic acid, 0.2 g of a 30% aqueous sodium hydroxide solution, 33.5 g of water and 0.7 g of 3-mercaptopropionic acid, was dropped into the reaction vessel together with 24 g of a 5.2% aqueous ammonium persulfate solution over a period of 4 hours, and then 6 g of a 5.2% aqueous ammonium persulfate solution was further dropped over a period of 1 hour. Thereafter, the temperature was maintained at 80° C. for 1 hour to complete the polymerization reaction, thus obtaining an aqueous solution of a polycarboxylic acid with a weight-average molecular weight of 24,600.

EXAMPLES 1 TO 8 AND COMPARATIVE EXAMPLES 1 TO 2

Mortars, containing present invention copolymers (1) to (4) (as obtained in Production Examples 1 to 4 respectively), comparative copolymers (1) and (2) (as obtained in Comparative Production Examples 1 and 2 respectively), and the polycarboxylic acid (as obtained in Referential Production Example 1) respectively as the cement additive in the amount of Table 1, were prepared, and the changes of their flow values with time and their mortar homogenization times were measured as follows.

The materials, as used for the test, and the mortar mixing ratio were 600 g of Chichibu Onoda's normal portland cement, 600 g of Toyoura standard sand, and 210 g of an aqueous solution containing the cement additive.

Mortar Test Method:

The mortar was prepared by kneading cement and sand without water at a low speed for 30 seconds, and then adding water containing the additive, and then kneading them for 3 minutes, wherein the kneading was carried out mechanically with a mortar mixer. As to the mortar homogenization time, the time for the mortar to fall into a homogeneous state was measured with the eye and regarded as the mortar homogenization time. Next, the prepared mortar was filled into a hollow cylinder of 55 mm in diameter and 55 mm in height at each time of 5 minutes, 30 minutes, 60 minutes, and 90 minutes after the addition of water. Next, after lifting the cylinder in perpendicular, the diameters of the mortar as spread on a table were measured in two directions, and the average value thereof was regarded as the flow value. The results are shown in Table 1.

TABLE 1

| | | Amount of addition (wt %/cement)[1] | Polycarboxylic acid (wt %/cement)[1] | Mortar homogenization time (sec)[2] | Mortar flow value (mm) | | | |
|---|---|---|---|---|---|---|---|---|
| | | | | | After 5 minutes | After 30 minutes | After 60 minutes | After 90 minutes |
| Example 1 | Present invention copolymer (1) | 0.15 | — | 60 | 110 | 100 | 90 | 75 |
| Example 2 | Present invention copolymer (2) | 0.15 | — | 60 | 104 | 92 | 79 | 72 |
| Example 3 | Present invention copolymer (3) | 0.15 | — | 60 | 110 | 97 | 81 | 70 |
| Example 4 | Present invention copolymer (4) | 0.25 | — | 15 | 113 | 93 | 87 | 82 |
| Example 5 | Present invention copolymer (1) | 0.075 | 0.075 | 70 | 118 | 100 | 91 | 77 |
| Example 6 | Present invention copolymer (2) | 0.075 | 0.075 | 70 | 119 | 102 | 82 | 77 |
| Example 7 | Present invention copolymer (3) | 0.075 | 0.075 | 70 | 110 | 99 | 77 | 73 |
| Example 8 | Present invention copolymer (4) | 0.125 | 0.125 | 30 | 115 | 96 | 89 | 84 |
| Comparative Example 1 | Comparative copolymer (1) | 0.15 | — | 120 | 110 | 95 | 80 | 65 |
| Comparative Example 2 | Comparative copolymer (2) | 0.15 | — | 70 | 110 | 75 | 55 | — |

[1]Solid content weight % relative to cement weight.
[2]Time for mortar to fall mto a homogeneous state.

Comparing present invention copolymers (1) to (4) with comparative copolymers (1) and (2) in respect to the mortar homogenization time from the results of Table 1, it would be understood that the mortar homogenization times of present invention copolymers (1) to (3) of Examples 1 to 3 are all 60 seconds, and the mortar homogenization time of present invention copolymer (4) of Example 4 is 15 seconds, while those of comparative copolymers (1) and (2) of Comparative Examples 1 and 2 are 120 seconds and 70 seconds respectively, so the mortar homogenization times of present invention copolymers (1) to (4) are all very fast.

The reason therefor is considered to be as follows. Present invention copolymers (1) to (3) have a molar number of addition of ethylene oxide of 75 mol in repeating unit (I), while comparative copolymer (1) has a molar number of addition of ethylene oxide of 25 mol. Thus, present invention copolymers (1) to (3) have a larger molar number of addition of ethylene oxide, therefore, have higher hydrophilicity and the advantage, for example, of giving cement particles wettability that is important for the mortar kneadability. In addition, present invention copolymer (4) has a molar number of addition of ethylene oxide of 25 mol in repeating unit (VII), therefore, the same molar number as comparative copolymer (1) has. However, present invention copolymer (4) having a butylene oxide chain on the ester bonding moiety has stronger hydrophobicity of the ester bonding moiety, therefore, exhibits greater effects to prevent the hydrolysis in a cement alkali, than comparative copolymer (1) having a propylene oxide chain on the ester bonding moiety. As a result, present invention copolymer (4) has greatly enhanced the mortar kneadability when compared with comparative copolymer (1).

In addition, as to comparative copolymer (2), it is considered that the molar number of addition of ethylene oxide therein is 75 mol, therefore, the same as those in present invention copolymers (1) to (3), but that comparative copolymer (2) has no propylene oxide moiety on the moiety of ester bonding to acrylic acid, therefore, easily hydrolyzes in a cement alkali to make the mortar homogenization time slower than those of present invention copolymers (1) to (3). As to present invention copolymers (1) to (3), it is considered that present invention copolymers (1) to (3) have a propylene oxide moiety on the ester bonding moiety, and further that present invention copolymer (4) has a butylene oxide moiety on the ester bonding moiety, therefore the hydrophobicity and the steric hindrance effects of the propylene oxide or butylene oxide could prevent the hydrolysis when compared with comparative copolymer (2) having ethylene oxide only.

Comparing present invention copolymers (1) to (4) with comparative copolymers (1) and (2) in respect to the change of the flow value with time, the mortar flow values of present invention copolymers (1) to (4) of Examples 1 to 4 are in the range of 70~82 mm after 90 minutes, while the mortar flow value of comparative copolymer (1) of Comparative Example 1 has decreased to 65 mm after 90 minutes. In addition, as to comparative copolymer (2) of Comparative Example 2, its mortar flow value has decreased to 55 mm after 60 minutes, so it would be understood that present invention copolymers (1) to (4) have very excellent fluid retainability.

The causes of the decrease of the fluid retainability with time are, for example, considered to be as follows. (1) The copolymer as adsorbed to cement particles grows embedded into crystals as formed by hydration reactions of the cement particles with time, so that the fluid retainability decreases. (2) The copolymer decomposes in a cement alkali.

The cause that the fluid retainability of comparative copolymer (1) is inferior to that of present invention copolymers (1) to (3) is considered to be as follows. Present invention copolymers (1) to (3) have a molar number of addition of ethylene oxide of 75 mol, while comparative copolymer (1) has a smaller molar number of addition of ethylene oxide of 25 mol and therefore exhibits a faster time to grow embedded into crystals, as formed by hydration reactions of cement particles, than present invention copolymer (1), so that the fluid retainability decreases. In addition, present invention copolymer (4) has a molar number of addition of ethylene oxide of 25 mol, therefore, the same molar number as comparative copolymer (1) has. However, it is considered that present invention copolymer (4) with a butylene oxide chain on the ester bonding moiety exhibits a little stronger hydrophobicity in the vicinity of cement particles than comparative copolymer (1) with a propylene oxide chain on the ester bonding moiety, and that the fluid retainability has been enhanced due to such a little hydrophobicity of present invention copolymer (4).

In addition, the cause that the fluid retainability of comparative copolymer (2) is inferior to those of present invention copolymers (1) to (4) is considered to be as follows. The molar number of addition of ethylene oxide in comparative copolymer (2) is 75 mol, therefore, the same as those in present invention copolymers (1) to (3), but comparative copolymer (2) has high hydrophilicity due to ethylene oxide having neither propylene oxide nor butylene oxide on the moiety of ester bonding to acrylic acid, and therefore easily undergoes ester hydrolysis in a cement alkali to lose the methoxypolyethylene glycol moiety, which is a dispersible group, with time, so that the fluid retainability of comparative copolymer (2) has decreased to less than those of present invention copolymers (1) to (4).

In addition, from the results of Examples 5 to 8, it would be understood that present invention copolymers (1) to (4) exhibit good mortar kneadability and excellent fluid retainability even if they are used jointly with the conventional polycarboxylic acid.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cement composition, which comprises cement, water and a cement additive, wherein the cement additive includes copolymer (A) having polyalkylene glycol ester unit (I) of general formula (1) below as a repeating unit and carboxylic unit (II) of general formula (2) below as a repeating unit in the weight ratio (I)/(II)=(1~99)/(99~1), wherein a water/cement ratio is 10–70 weight % and wherein a ratio of the cement additive is 0.01–10 weight % in terms of solid content to the cement weight, wherein general formula (1) is:

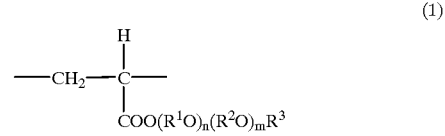

where:
R$^1$O denotes an oxyalkylene group with 3 to 7 carbon atoms or a mixture of two or more thereof, wherein the mixture may be formed by either block addition or random addition;
R$^2$O denotes an oxyalkylene group with 2 to 18 carbon atoms or a mixture of two or more thereof, wherein the mixture may be formed by either block addition or random addition;
R$^3$ denotes a hydrocarbon group with 1 to 3 carbon atoms;

n is an average molar number of addition of $R^1O$ and denotes a number of 1 to 50;

m is an average molar number of addition of $R^2O$ and denotes a number of 51 to 300; and not less than 80 mol % of the oxyalkylene groups (total of $R^1O$ and $R^2O$) are oxyethylene groups;

and wherein general formula (2) is:

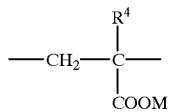
(2)

where:

$R^4$ denotes hydrogen or a methyl group; and.

M denotes hydrogen, a monovalent metal, a divalent metal, ammonium, or an organic amine.

2. A cement composition according to claim 1, wherein $R^2O$ in general formula (1) is an oxyethylene group.

3. A cement composition according to claim 1, wherein the ratio of the polyalkylene glycol ester units with a molar number of addition of $R^1O$ of 0 mol is not more than 2 weight % of the entire polyalkylene glycol ester units (I) of general formula (1) in terms of alcohol $(HO(R^1O)_n(R^2O)_mR^3)$.

4. A cement composition according to claim 1, wherein the ratio of the polyalkylene glycol ester units with a molar number of addition of $R^1O$ of not larger than 1 mol is not more than 20 weight % of the entire polyalkylene glycol ester units (I) of general formula (1) in terms of alcohol $(HO(R^1O)_n(R^2O)_mR^3)$.

5. A cement composition according to claim 1, wherein there is a relation of (m/n)>8 between the average molar number n of addition of $R^1O$ and the average molar number m of addition of $R^2O$.

6. A cement composition, which comprises cement, water and a cement additive, wherein the cement additive includes copolymer (C) having polyalkylene glycol ester unit (VII) of general formula (5) below as a repeating unit and carboxylic unit (VIII) of general formula (6) below as a repeating unit in the weight ratio (VII)/(VIII)=(1~99)/(99~1), wherein a water/cement ratio is 10–70 weight % and wherein a ratio of the cement additive is 0.01–10 weight % in terms of solid content to the cement weight, wherein general formula (5) is:

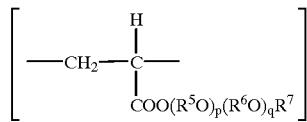
(5)

where:

$R^5O$ denotes an oxyalkylene group with 4 to 7 carbon atoms or a mixture of two or more thereof, wherein the mixture may be formed by either block addition or random addition;

$R^6O$ denotes an oxyalkylene group with 2 to 18 carbon atoms or a mixture of two or more thereof, wherein the mixture may be formed by either block addition or random addition;

$R^7O$ denotes a hydrocarbon group with 1 to 3 carbon atoms;

p is an average molar number of addition of $R^5O$ and denotes a number of 1 to 50;

q is an average molar number of addition of $R^6O$ and denotes a number of 51 to 300; and not less than 80 mol % of the oxyalkylene groups (total of $R^5O$ and $R^6O$) are oxyethylene groups;

and wherein general formula (6) is:

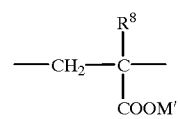
(6)

where:

$R^8$ denotes hydrogen or a methyl group; and

M' denotes hydrogen, a monovalent metal, a divalent metal, ammonium, or an organic amine.

7. A cement composition according to claim 6, wherein $R^6O$ in general formula (5) is an oxyethylene group.

8. A cement composition according to claim 6, wherein the ratio of the polyalkylene glycol ester units with a molar number of addition of $R^5O$ of 0 mol is not more than 2 weight % of the entire polyalkylene glycol ester units (VII) of general formula (5) in terms of alcohol $(HO(R^5O)_p(R^6O)_qR^7)$.

9. A cement composition according to claim 6, wherein the ratio of the polyalkylene glycol ester units with a molar number of addition of $R^5O$ of not larger than 1 mol is not more than 20 weight % of the entire polyalkylene glycol ester units (VII) of general formula (5) in terms of alcohol $(HO(R^5O)_p(R^6O)_qR^7)$.

10. A cement composition according to claim 6, wherein there is a relation of (q/p)>8 between the average molar number p of addition of $R^5O$ and the average molar number q of addition of $R^6O$.

* * * * *